United States Patent
DeHaven

(10) Patent No.: US 9,385,611 B2
(45) Date of Patent: Jul. 5, 2016

(54) POWER ADAPTER HAVING PROGRAMMABLE GAIN COMPENSATION TRIM

(75) Inventor: Maxwell Scott DeHaven, Middlebury, IN (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 930 days.

(21) Appl. No.: 13/457,784

(22) Filed: Apr. 27, 2012

(65) Prior Publication Data
US 2013/0285460 A1    Oct. 31, 2013

(51) Int. Cl.
| | |
|---|---|
| *H02J 1/00* | (2006.01) |
| *H02J 1/10* | (2006.01) |
| *H02M 3/28* | (2006.01) |
| *H02M 3/335* | (2006.01) |
| *H02M 1/00* | (2006.01) |

(52) U.S. Cl.
CPC .......... *H02M 3/285* (2013.01); *H02M 3/33515* (2013.01); *H02M 2001/0025* (2013.01); *Y10T 307/707* (2015.04)

(58) Field of Classification Search
CPC ..................... H02M 3/285; H02M 2001/0025; H02M 3/33515
USPC ............................................... 307/82; 363/81
See application file for complete search history.

(56) References Cited

U.S. PATENT DOCUMENTS

| | | | |
|---|---|---|---|
| 4,521,842 A * | 6/1985 | Kammiller | 363/71 |
| 5,239,575 A * | 8/1993 | White et al. | 379/106.06 |
| 5,724,237 A * | 3/1998 | Hunter | 363/65 |
| 6,292,378 B1 | 9/2001 | Brooks | |
| 6,809,678 B2 | 10/2004 | Vera et al. | |
| 7,795,754 B2 | 9/2010 | Ho | |
| 8,067,927 B2 | 11/2011 | Wu | |
| 2004/0075600 A1* | 4/2004 | Vera et al. | 341/166 |
| 2004/0146189 A1* | 7/2004 | Langan | 382/128 |
| 2005/0127757 A1* | 6/2005 | Wilson et al. | 307/29 |
| 2006/0136154 A1* | 6/2006 | Bliley et al. | 702/58 |
| 2006/0267563 A1* | 11/2006 | Belson et al. | 323/266 |
| 2008/0087723 A1* | 4/2008 | Kargl et al. | 235/380 |
| 2009/0240960 A1* | 9/2009 | Kunst | 713/300 |
| 2011/0068634 A1* | 3/2011 | Kammeter et al. | 307/82 |
| 2011/0164442 A1 | 7/2011 | Hannas | |

OTHER PUBLICATIONS

Cheng, Chin-Hsing, Current sharing of paralleled DC-DC converters using GA-based PID controllers, Expert Systems with Applications, Jan. 2010, 37 (2010) 733-740, Elsevier.
Ho, Hsin-Hsin, Improved Current Sharing Performance by Dynamic Droop Scaling Technique in Multiple Power Systems, Jun. 17-21, 2007, 189-193, IEEE.

* cited by examiner

Primary Examiner — Kenneth B Wells
Assistant Examiner — James P Evans
(74) Attorney, Agent, or Firm — Robert C. Sismilich

(57) ABSTRACT

A power adapter to supply power at an output. The power adapter has a programmable gain compensation trim function. In some examples, the gain compensation trim function is a negative gain compensation trim function, and the output of plural power adapters are connected together to form a power supply.

20 Claims, 10 Drawing Sheets

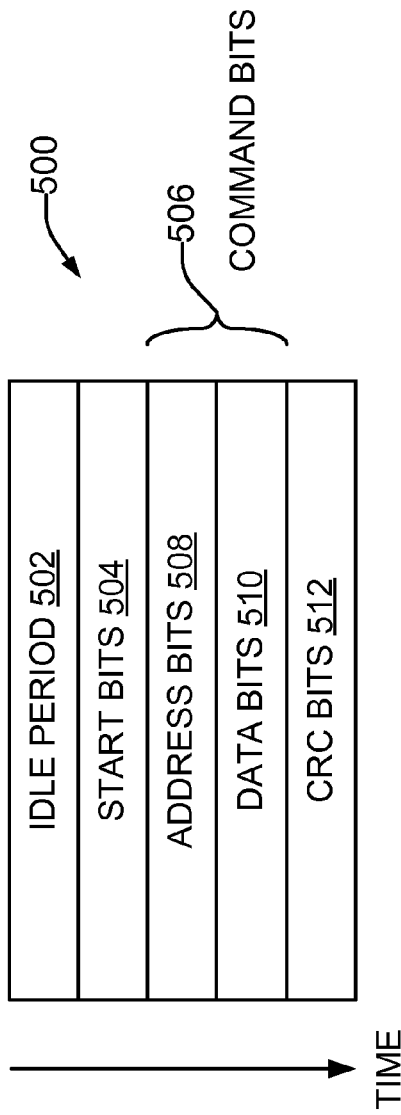

POWER ADAPTER HAVING PROGRAMMABLE GAIN COMPENSATION TRIM

BACKGROUND

Power adapters are used to supply power to a wide variety of electronic products. Such products can include laptop and notebook computers, printers, scanners, and DVD/CD players, to name just a few. Some power adapters are AC-to-DC power adapters, which receive AC input power, such as from a wall outlet in a home or business, and generate a DC output. Other power adapters are DC-to-DC power adapters, which receive DC input power at one voltage, such as from a car battery or an airline jack, and generate a DC output at another voltage.

A typical power adapter provides power to the electronic load device to which it is connected at a nominal regulated voltage. The adapter can supply a predetermined maximum amount of current, average current, or both. Different electronic devices, even those which operate at the same nominal voltage, may draw different maximum amounts of current during operation. While a power adapter that could supply the largest amount of current used by any of a variety of electronic devices could be provided, it is typically not feasible to do so. Generally, the larger the amount of maximum current to be supplied, the more expensive and physically larger the power adapter will be. As a result, a variety of different power adapter models with different maximum current ratings matched to different electronic products are often utilized. However, this results in additional design work for each different adapter, complicates the production and stocking of adapters, and the reduction in unit quantities of any particular model adapter can raise production costs.

BRIEF DESCRIPTION OF THE DRAWINGS

FIG. 5 is a schematic representation of a communications protocol in accordance with an embodiment of the present disclosure usable for commands sent from a load device to a power adapter.

FIG. 6 is a schematic representation of an addressable register set of controller in accordance with an embodiment of the present disclosure usable with the power adapter of FIG. 1 or FIG. 2.

DETAILED DESCRIPTION

Figure 1:
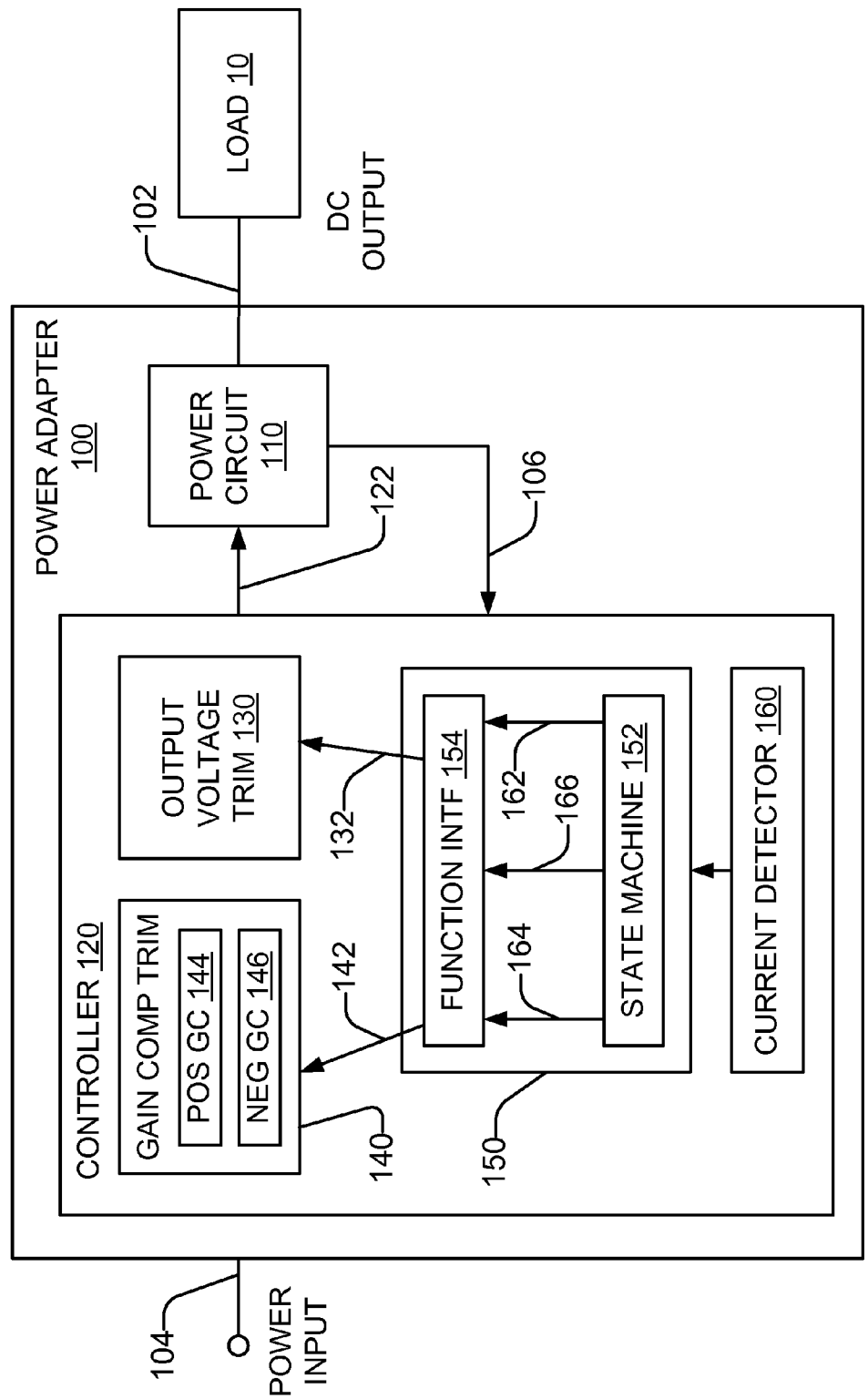
FIG. 1 is a schematic block diagram representation of a power adapter in accordance with an embodiment of the present disclosure.

As noted in the Background section, the proliferation of power adapters, particularly for the same nominal voltage, raises costs to both manufacturers and consumers. It would be desirable in many instances to connect together in parallel the outputs of a number of power adapters of the same nominal voltage and maximum current rating in order to collectively provide sufficient current to a given electronic device.

Unfortunately, however, it typically is not possible to do this, without undesirably adding cost and complexity to each adapter, and/or without reducing the total power output and efficiency of the adapters.

Due to component variations and other factors in power adapters—particular in low-cost/high-volume adapters—the nominal output voltage typically varies among adapters. This variation in nominal output voltage can be as high as +/−10%, or higher in some cases. In addition, the typical adapter has an output voltage reduction ("output voltage droop") over a current range from no load to full load that can equate to several volts, or several %, of additional output voltage variation. In addition, the output voltage droop may be variable with cable impedance, cable length, and power supply output impedance, and furthermore may be materially different between two similarly constructed adapters. The output voltage droop may be expressed, for a particular adapter, as a graph of regulated voltage vs. current demanded (also referred to as a "voltage/current curve") that describes the decrease in output voltage that occurs for an increase in current drawn. The combination of these variations typically prevent two or more adapters from performing effectively in a simple current sharing scheme where the outputs of the adapters are simply wired together. The term "effective current sharing", as defined herein and in the appended claims, shall be broadly understood to mean supplying current from plural power adapters to a common load in a relatively equal way among all the adapters, such that the amount of current supplied under typical loading conditions varies by approximately 20% from adapter-to-adapter, and ideally would match to 10% or less across a range of adapters. If one power adapter is supplying an excessive portion of the current to the load relative to another power adapter, it may generate excessive internal temperatures that can shut the adapter down, degrade its operation, or shorten its lifetime. Under certain conditions, the differences in nominal output voltage and output voltage droop between power adapters may prevent an adapter from regulating at all.

As defined herein and in the appended claims, a "power adapter" shall be broadly understood to mean a device that receives input power and supplies DC output power at a regulated output voltage and at a variable current ranging from 0 amps to a maximum number of amps that corresponds to the full rated output current which the adapter is capable of supplying. An "AC-to-DC power adapter" receives AC input power, while a "DC-to-DC power adapter" receives DC input power.

As defined herein and in the appended claims, a "power supply" shall be broadly understood to mean a power source constructed from one or more power adapters that have the same nominal DC output voltage.

Referring now to the drawings, there is illustrated an example of a power adapter constructed in accordance with the present disclosure that has a gain compensation function that is programmable to either increase the regulated voltage with increasing load current, or decrease the regulated voltage with increasing load current. When the gain compensation function is operated as a negative gain compensation function that decreases the regulated voltage with increasing load current, the outputs of a number of power adapters of the same nominal voltage rating can advantageously be connected together in parallel to provide more current to an electronic device at a regulated voltage than a single adapter can individually supply, with the multiple power adapters sharing current among them in an effective manner. By applying to each adapter individually a proper amount of negative gain compensation, in some cases along with a proper amount of voltage trim, differences in the voltage/current curve that describes the relationship of output voltage to output current can be reduced or minimized between all the adapters in order to allow effective current sharing. As a result, a single model of power adapters of a given nominal output voltage can be used to power a number of different electronic devices with differing current requirements at that given voltage by connecting together in parallel the proper number of adapters. The need for a manufacturer to design, produce, and stock different power adapters can be reduced or eliminated, while a user who has a number of different electronic devices can mix-and-match power adapters between devices. Thus both manufacturers and users can realize appreciable cost savings, flexibility, and convenience.

As defined herein and in the appended claims, the term "gain compensation" shall be broadly understood to mean the change in regulated output voltage of a power adapter that occurs with a change in output current drawn from the power adapter by a load connected to the output of the power adapter.

As defined herein and in the appended claims, the term "positive gain compensation" shall be broadly understood to mean the increase in regulated output voltage of a power adapter that occurs with an increase in output current drawn from the power adapter by a load connected to the output of the power adapter.

As defined herein and in the appended claims, the term "negative gain compensation" shall be broadly understood to mean the decrease in regulated output voltage of a power adapter that occurs with an increase in output current drawn from the power adapter by a load connected to the output of the power adapter.

As defined herein and in the appended claims, the term "trim function" shall be broadly understood to mean a mechanism or function that adjusts the associated characteristic of a power adapter from a nominal value. For example, a "voltage trim function" adjusts the regulated output voltage of a power adapter independent of the amount of output current drawn from the power adapter by a load connected to the output of the power adapter (or, in other words, for all values of load current). As another example, a "gain compensation trim function" adjusts the change in regulated output voltage of a power adapter that occurs with a change in output current drawn from the power adapter by a load connected to the output of the power adapter.

Considering now one example of a power adapter according to the present disclosure, and with reference to FIG. 1, a power adapter 100 has a DC output 102. A load device 10 can be connected to the DC output 102. The load 10 may be the electronic device that the adapter 100 is intended to power, or the load may be a test fixture that is used to configure or calibrate the adapter 100. The power adapter 100 converts input power, which depending on the adapter may be either AC or DC, that is supplied to a power input 104 into DC output power at a regulated output voltage at the DC output 102. The load 150 determines the amount of DC current that is supplied by, or drawn from, the power adapter 100. The output current at the output voltage is supplied from a power circuit 110 coupled to the output 102.

The power adapter 100 includes a controller 120. The controller 120 generates a control signal 122 that is applied to the power circuit 110 to maintain or regulate the amount of output power supplied by the power adapter 100. In some examples, the control signal 122 is a pulse width modulated (PWM) control signal. Feedback 106 from the power circuit 110 as to the present power output conditions is provided to the controller 120. In some examples, the feedback 106 may indicate the voltage present at the DC output 102, the voltage input to the power circuit 110, the switched current to the load, or any combination of these at varying points in time. The controller 120 uses the feedback 106 to adjust, at least in part, the control signal 122 so as to regulate the voltage at the output 102.

The control signal 122 is also adjusted, at least in part, responsive to an output voltage trim function 130 of the controller 120. The voltage trim function 130 adjusts the nominal regulated output voltage generated by the power circuit 110 at the output 102, independent of the amount of output current drawn from the output 102 by the load 10. The voltage trim function 130 is responsive, in turn, to a voltage trim setting 132 provided to the function 130 that specifies the amount of adjustment in the nominal regulated output voltage to correct the nominal regulated output voltage to the desired regulated output voltage.

The control signal 122 is further adjusted, at least in part, responsive to a gain compensation trim function 140 of the controller 120. The gain compensation trim function 140 adjusts the regulated output voltage generated by the power circuit 110 at the output 102 in response to the amount of output current drawn from the output 102 by the load 10. The gain compensation trim function 140 is responsive, in turn, to a gain compensation trim setting 142 provided to the function 140 that specifies the desired amount of change in the regulated output voltage for a given change in output current.

The gain compensation trim function 140 is programmable to either increase the regulated output voltage with increasing current drawn by the load 10, decrease the regulated output voltage with increasing current drawn by the load 10, or maintain the regulated output voltage at a constant level regardless of output load 10. To this end, the gain compensation trim function 140 can operate in both a positive gain compensation trim mode 144 and a negative gain compensation trim mode 146. The gain compensation trim function 140 may be operated in the positive gain compensation trim mode 144 in order to implement a cable compensation mode of operation of the power adapter 100. Without cable compensation, if there is a relatively long cable connection between the power adapter 100 and the load 10, or if a relatively large amount of current is drawn by the load 10, the input voltage at the load 10 may be lower than the output voltage of the power adapter 100 due to the amount of resistance in the cabling or interconnect mechanism. The amount by which the load input voltage is lowered is proportional to the amount of current drawn and the inherent output impedance of the power circuit 110. By appropriately utilizing the positive gain compensation trim mode 144, the increase in regulated output voltage of the power adapter 100 with increasing current draw can compensate for the decrease in input voltage seen at the load 10 with increasing current draw due to cabling and power circuit loss effects. Thus a judicious selection of a positive gain compensation trim parameter can be made which reduces or minimizes the change in the input voltage at the load 10 over a wide current range.

The gain compensation trim function 140 may alternatively be operated in the negative gain compensation trim mode 146 in a current-sharing mode of operation where the outputs of multiple power adapters 100 are connected together in a simplified paralleling scheme. As has been described heretofore, many power adapters, and lower-cost power adapters in particular, have differences in their nominal output voltage, and in their nominal output voltage droop. By appropriately adjusting the negative gain compensation trim mode 146 of each of the multiple power adapters 100 that are connected together, the adapters 100 can be configured to reduce or minimize adapter-to-adapter differences in the slope of the voltage/current curve. Thus a judicious selection of a negative gain compensation trim setting 142 can be made individually for each adapter 100 which, together with the corresponding voltage trim setting 132 for that adapter 100, reduces or minimizes the differences in the voltage/current curves of the multiple adapters 100, so as to implement effective current-sharing among the multiple adapters 100 over a wide current range. An example of the minimization of differences in the voltage/current curve of adapters will be discussed subsequently with reference to FIGS. 8-9.

The voltage trim setting 132 and the gain compensation trim setting 142 are provided to their respective functions 130, 140 by a command processor 150 in the controller 120. The command processor 150 generates these settings 132, 142 in response to recognizing particular patterns of modulated current pulses, provided to the command processor 150, that are transformed into the settings 132, 142. In this manner, the command processor 150 programs the voltage trim function 130 and the gain compensation trim function 140. As will be discussed subsequently in greater detail, the pattern of modulated current pulses that is recognized by the command processor 150 is generated by the load device 10.

An output current level detection mechanism 160 in the controller 120 determines the level of current being supplied by the power adapter 100 to the load 10. In some examples the current level detection mechanism 160 may use the feedback 106 from the power circuit 110, along with characteristics of the control signal 122, to derive the current level. Current pulses at the output 102, as modulated by the load 10, can be detected by the output current level detection mechanism 160 as changes in the current level.

A state machine 152 in the command processor 150 constructs commands from the pattern of modulated current pulses. The commands may include, for example, a voltage trim command 162, a gain compensation trim command 164, and a relative trim adjustment command 166, among others. The state machine 152 provides the commands to a function interface 154. In some examples, the function interface 154 may include an addressable set of writeable registers, where each register corresponds to a different command. The function interface 154, in turn, interfaces to various functions of the controller 120 including, for example, the voltage gain function 130 and the gain compensation trim function 140, and provides the voltage trim settings 132 and the gain compensation trim settings 142 to the functions 130, 140 respectively.

The voltage trim setting 132 and the gain compensation trim setting 142 may be in either absolute or relative form. An absolute voltage trim setting 132 may be generated in response to a voltage trim command 162 that includes a parameter which specifies the desired absolute amount of the voltage trim adjustment to be implemented by the voltage trim function 130. An absolute gain compensation trim setting 142 may be generated in response to a gain compensation trim command 164 that includes a parameter which specifies whether positive, negative, or no gain compensation is to be applied and, for positive or negative gain compensation, the desired absolute amount of the gain compensation to be implemented by the gain compensation function 140. A relative voltage trim setting 132 may be generated in response to a relative trim adjustment command 166 that includes a parameter which specifies the desired amount by which the presently-existing setting of the voltage trim function 130 is to be adjusted. A relative gain compensation trim setting 142 may be generated in response to a relative trim adjustment command 166 that includes a parameter which specifies the desired amount by which the presently-existing setting of the gain compensation function 140 is to be adjusted.

An example state machine 152 will be discussed subsequently in greater detail with reference to FIG. 3, and an example function interface 154 will be discussed subsequently in greater detail with reference to FIG. 6.

Figure 2:
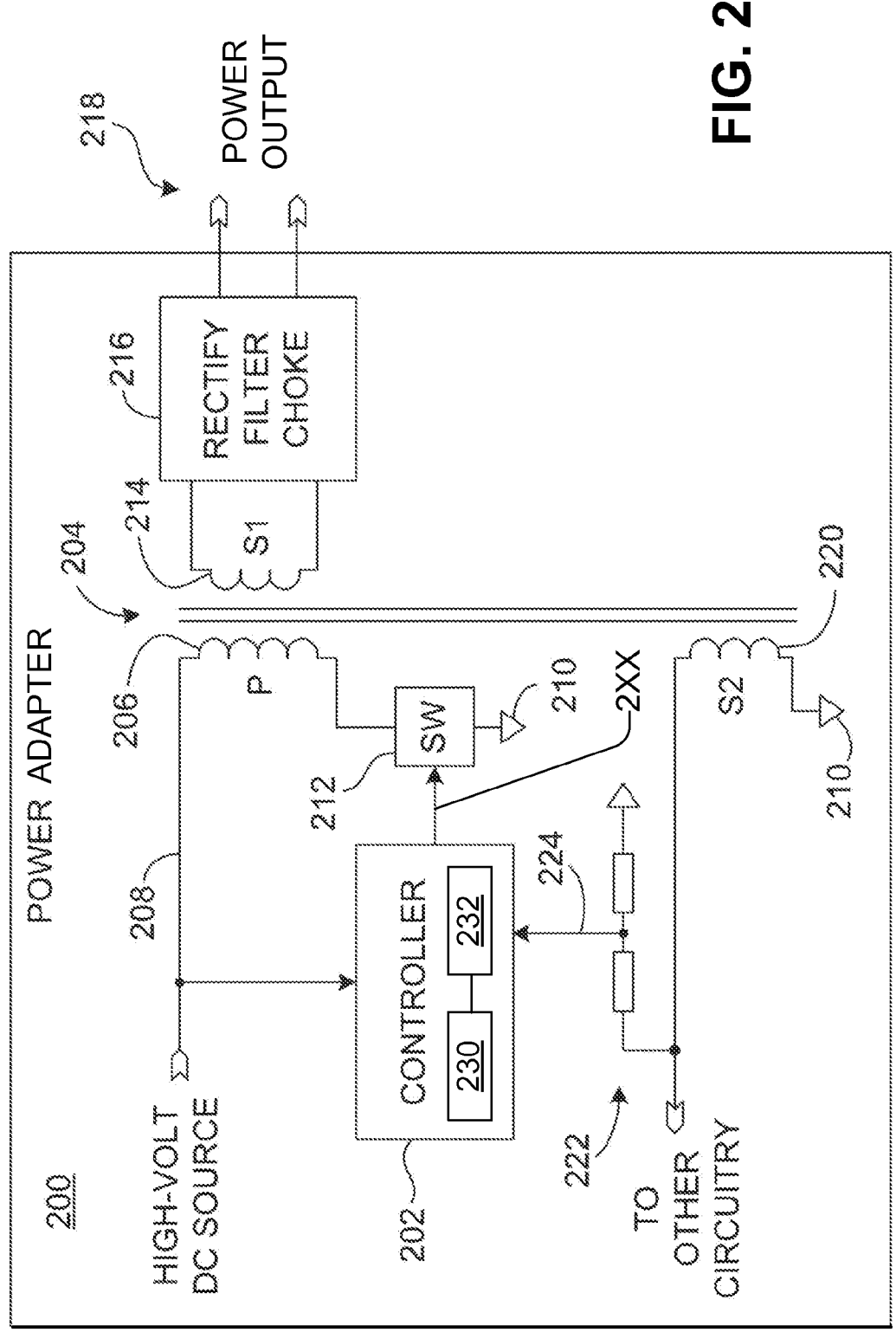
FIG. 2 is a schematic block diagram representation of another power adapter in accordance with an embodiment of the present disclosure.

Considering now another example of a power adapter according to the present disclosure, and with reference to FIG. 2, a power adapter 200 includes a controller 202. The controller 202 can be variously defined by electronic circuitry, a processor or microcontroller 230 running a program code (i.e. machine-readable instructions) stored in a memory 232 coupled to the processor or microcontroller 230, and so on. For purposes of example herein, the controller 202 is defined, at least in part, by an application-specific integrated circuit (ASIC), as available from Texas Instruments, Dallas, Tex., USA. As such, the controller 202 has been configured and programmed, respectively, to operate in accordance with the present disclosure.

The power adapter 200 also includes a power transformer 204. The transformer 204 includes a primary winding 206 coupled to a source of high-voltage direct-current (HVDC) energy by way of a node 208. The specific identity and constituency of the HVDC energy source is not germane to the present teachings; in some examples, the HVDC energy source may be derived from an AC input. The primary winding 206 is also coupled to a ground node 210 by way of a switch 212. In one example, the switch 212 is a defined by a power metal-oxide semiconductor field-effect transistor (i.e., power MOSFET). Other suitable switches 212 can also be used.

The power transformer 204 includes a secondary winding 214. Electrical power is transferred from the primary winding 206 to the secondary winding 214 by inductive coupling. In one example, the power transformer 204 is a step-down transformer—that is, the (average) voltage output from the secondary winding 214 is lesser than the (average) voltage applied to the primary winding 206.

The power adapter 200 further includes rectification, filtering and choke (RFC) circuitry 216. The RFC circuitry 216 can include any suitable power conditioning or filtering circuitry. In one example, the RFC circuitry 216 includes a full-wave bridge rectifier (not shown), one or more filter capacitors (not shown) and a radio-frequency choke or inductor (not shown). As such, the RFC circuitry 216 is configured to rectify the electrical output from the secondary winding 214 and to attenuate any ripple or RF noise present in that electrical energy.

The RFC circuitry 216 couples the conditioned electrical energy to an output 218. It is to be understood that the specific configuration and constituency of the RFC circuitry 216 are not germane to the present teachings, and that such is depicted in block diagrammatic form in the interest of clarity.

The power transformer 204 also includes a secondary winding 220. The secondary winding 220 is configured to provide a feedback signal corresponding to the output 218. That is, the secondary winding 220 provides a voltage signal that varies in direct relationship with the output 218. Thus, the secondary winding 220 provides feedback with respect to the instantaneous voltage and current at the output 218 by way of electromagnetic coupling.

The feedback signal from the secondary winding 220 is reduced in magnitude by way of voltage divider 222 such that a scaled-down feedback signal is provided at a node 224. The feedback signal at the node 224 is provided to or sensed by the controller 202. The controller 202 also senses the HVDC energy at the node 208.

The controller 202 is configured to regulate a voltage at the output 218 from the power adapter 200. In particular, the controller 202 is configured to provide a pulse-width modulated (PWM) control signal to the switch 212. The controller 202 is also configured to sense the feedback signal at the node 224 and to adjust the PWM control signal so as to maintain a present operating level, such as a regulated output voltage, at the output 218 (e.g., thirty-two volts DC).

Additionally, the controller 202—the ASIC introduced above—is defined by a plurality of functions and adjustable parameters. Among these, the controller 202 may include a voltage trim function 130 and a gain compensation trim function 140 as have been described heretofore with reference to FIG. 1. These functions can be adjusted by loading particular values into particular registers within the controller 202. The functions and adjustable parameters of one example controller 202 according to the present disclosure will be discussed subsequently with reference to FIG. 6.

A load device (not shown) that is coupled to the output 218 can vary or modulate the electrical current delivered by the power adapter 200 to the load so as to generate current pulses in accordance with a communication protocol. These current pulses are sensed by the controller 202 within the power adapter 200 by way of the feedback signaling at node 224, and subsequently decoded. This implements a mode of digital communication from the load to the power adapter 200, as the load generates particular sequences of the current pulses that will be decoded by the controller 200 as corresponding commands, such as for example the voltage trim command 132 and gain compensation trim command 142 described heretofore.

Figure 3:
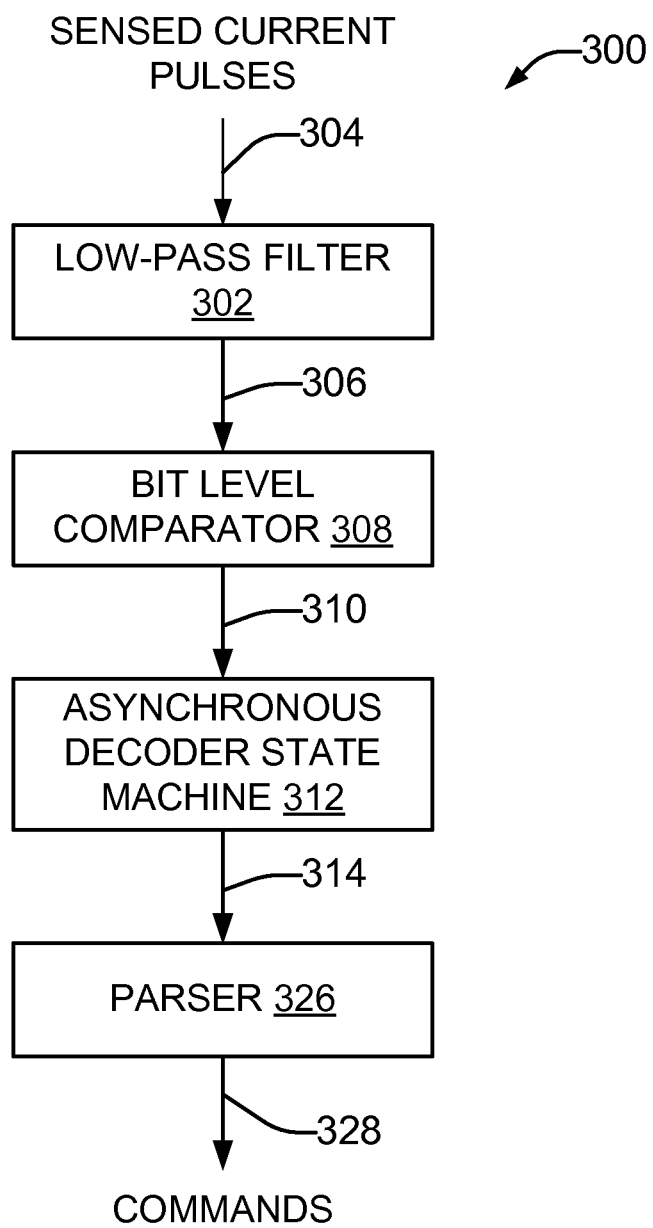
FIG. 3 is a schematic representation of a state machine of a controller usable with the power adapter of FIG. 1 or FIG. 2 in accordance with an embodiment of the present disclosure.

Considering now in greater detail the controller, such as the controller 120 (FIG. 1) or the controller 202 (FIG. 2) of a power adapter, and with reference to FIG. 3, in some examples the controller includes a state machine 300. In some examples, the state machine 300 may correspond to the state machine 152 of the command processor 150 (FIG. 1). The state machine 300 is configured to receive electrical current signaling from time to time at an input 304. The electrical current signaling may be the electrical current pulses sensed by current pulse sensor 160 (FIG. 1), or the current pulses present in the feedback signal of node 224 (FIG. 2). These current pulses are generated by the load device modulating the current drawn from the connected power adapter. The state machine 300 processes these pulses to derive meaningful digital data that can be used to adjust or alter one or more operating settings of the power adapter, such as the voltage trim function or the gain compensation trim function.

The state machine 300 includes a low-pass filter 302. The low-pass filter 302 is configured to receive electrical current pulses at an input 304. These current pulses at the input 304 are provided by way of controlled modulation of current being provided by the power adapter to a load device. The low-pass filter 302, in one example, is a moving average filter that operates at a data sampling speed. In one example, an electrical signal at the input 304 is sampled at a rate of eight-hundred Hertz. Other sampling rates can also be used. The low-pass filter 302 then provides an output signal or filtered signal 306 equal to an average of the eight most recent samplings. Under this example scheme, a span of eight sample periods is about equal to one data bit period or one bit-time. Thus, the low-pass filter is considered to over-sample the signal at the input 304.

The state machine 300 also includes a bit level comparator 308. The bit level comparator 308 is configured to sample the output signal 306 from the low-pass filter 302 and to compare each sample to a pair of threshold values. A digital bit stream 310 is generated in accordance with these comparisons. In one example, the threshold values are one-third Amp and two-thirds Amp, respectively, while the sampling frequency is one-hundred Hertz. The bit level comparator 308 therefore generates a digital bit stream 310 defined by a frequency of one-hundred Hertz. The digital bit stream 310 is further defined by rising edges and falling edges, respectively. In one example, a rising edge is logic "zero", and a falling edge is logic "one". Opposite definitions can also be used.

The state machine 300 further includes an asynchronous decoder state machine (ADSM) 312. In one example, the ADSM 312 is a Manchester decoder state machine that includes a number of functional states. The ADSM 312 detects a predefined idle period in the digital bit stream 310. In one example, the predefined idle period is a sequence of four logic "zero" bits. That is, a valid idle period spans four consecutive bit-times (e.g., about forty milliseconds) when logic "zeros" are present but not logic "ones". Following detection of the idle period, the ASDM 312 detects rising and falling edges within the digital bit stream 310. The ASDM 312 looks for a predefined pattern of start bits in the bit stream 310 following the idle period. If the start bits are detected, then a number of following data bits are captured. The captured data bits may define a particular command, including the parameters of that command. After validity of the command is verified, in one example through the absence of extraneous or unexpected rising or falling edges in the digital bit stream 310 and/or analysis of additional CRC bits, the data bits 314 are passed to a parser 326. The parser 326 assembles the data bits 314 and provides them, in one example, to the function interface 154 (FIG. 1). The assembled data bits 314 provides to the function interface 154 may correspond to various commands such as, for example, the voltage trim command 162, gain compensation trim command 164, or relative adjustment command 166 (FIG. 1).

Figure 4:
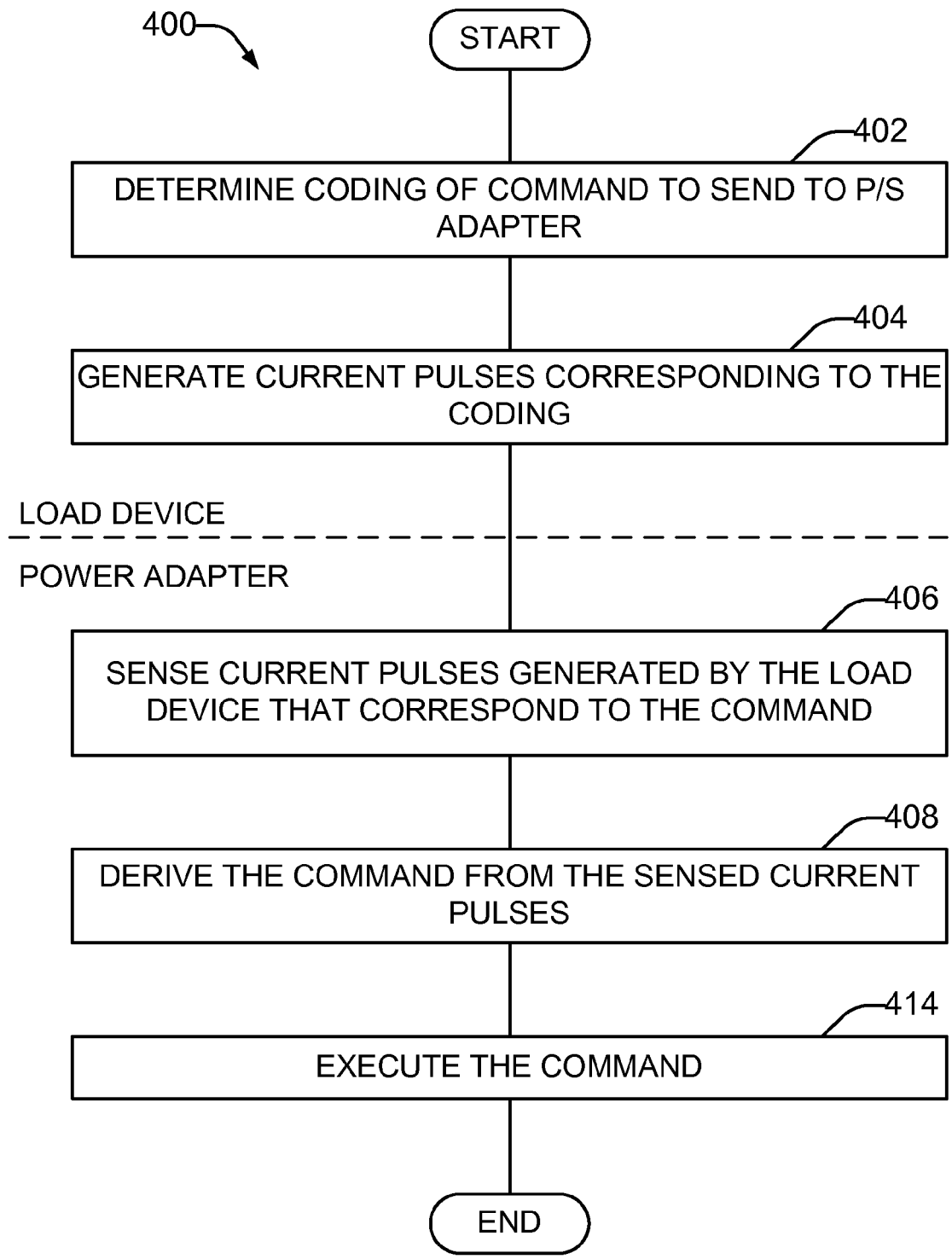
FIG. 4 is a flowchart in accordance with an embodiment of the present disclosure of a method by which a load device sends a command to a power adapter and the power adapter receives and executes the command.

Consider now, with reference to FIG. 4, one example of a flowchart of a method 400 by which a load device sends a command to a power adapter, and the power adapter receives and executes the command. A first portion of the flowchart (blocks 402-404) may be considered as a flowchart of the load device, and a second portion of the flowchart (blocks 406-414) may be considered as a flowchart of the power adapter.

Alternatively, the first portion of the flowchart may be considered as steps in a method implemented in the load device, and the second portion of the flowchart may be considered as steps in a method implemented in the power adapter.

At 402, coding is determined for a command to be sent to a power adapter. For purposes of example, assume that the regulated output voltage of the power adapter should be increased by 4% from the nominal output voltage to bring it within an optimal range for a particular load device. A load device (which may be the particular load device itself, or a different load device used for example for calibration purposes) connected to the power adapter constructs a digital message corresponding to a voltage trim command to cause the power adapter to change the regulated output in accordance with the new voltage requirement. The message has a particular bit length and is compliant with a communication protocol according to the present disclosure that is understood by the power adapter.

At 404, current pulses are generated according to the command coding by the load device modulating the switching of the electrical current. These pulses are generated after an idle period in which the load device holds the electrical current steady for a predefined time span. In one example, such a time span is equal to four bit-time periods, or about forty milliseconds. As such, the electrical current drawn from the power adapter during this time remains about constant with no significant sags or spikes. The controller within the power adapter detects this idle period and, in response, anticipates a communication from the load device to begin in the next bit-time period. The current pulses may be generated by the load device by, for example, increasing and decreasing the load applied to the power adapter. The current pluses that are generated have rising and falling edges in accordance with the twenty-four bit message to be sent to the power adapter.

At 406, the current pulses generated by the load device are sensed by the power adapter. In one example, the current pulses may be sensed using the output current level detection mechanism 160 (FIG. 1). In another example, the current pulse sensing may utilize transformer feedback such as the secondary winding 220 of the transformer 204 (FIG. 2) combined with internal processing in the controller 202. In some examples the current pulses may be converted to voltage pulses that are input to the controller, such as by the voltage divider 222 which produces voltage pulses at node 224 for processing by the controller 202.

At 408, a digital command is derived from the sensed current pulses. The controller constructs the digital command from the pulses input to the controller. A state machine of the controller, such as state machine 300 for example, may detect the current pulses and shape or condition them into digital bits ("ones" and "zeros"). The state machine further tests the validity of the bits in terms of rising and falling edge integrity, timing, spacing, the presence of a valid start bit sequence (e.g. "10110"), and so on. For purposes here, it is assumed that valid bits and sequences thereof are received in accordance with the communications protocol of the present disclosure. The bits are progressively captured and then validated, such as for example by comparing subsequent CRC bits against the protocol for validity. If the CRC bits are valid, then, the captured digital bits are parsed into their corresponding command.

At 414, the command is executed by the controller. In the present example, the output voltage trim function 130 of the controller 120 (FIG. 1) processes the command and makes an output voltage increase of four percent. In some examples, this may be done by loading an appropriate data value, such as a parameter included in the command, into a corresponding register of the controller, such as a register of the function interface 154 (FIG. 1). The controller subsequently regulates the output of the power adapter at this new, changed voltage level.

Considering now a communications protocol associated with the current pulses sent from a load device to a power adapter, and with reference to FIG. 5, the protocol is illustrative of digital commands received and acted upon by a controller (e.g., 120, 202) of a power adapter (e.g., 100, 200). The protocol 500 provides for the communication of a sequence of digital bits encoded as current pulses from the load device to the power adapter.

The protocol 500 of a command includes an idle period 502. The idle period 502 is the first event or sequence of digital bits (or their equivalent) sent from the load device to the power adapter to ready the communication channel for a forthcoming bitstream. The idle period 502, in one example, is defined by four bit-time periods equal to logic "zero", or "0000". That is, four consecutive bit-time periods of no current pulses (i.e. approximately constant load device current consumption).

The protocol 500 also includes one or more start bits 504. The start bits 504 are typically a predefined sequence of digital bits following the idle period 502. In one example, the start bits 504 may be the five bits "10110". Other start bit sequences or numbers of bits can also be used.

The protocol 500 further includes command bits 506. The command bits 506 specify, directly or indirectly, a function in the controller that is to be programmed, and a corresponding parameter with which that function is to be programmed. The controller provides an interface, such as for example the function interface 154 (FIG. 1), through which the various functions of the controller may be programmed. In one example, the function interface is a set of addressable registers in the controller. One or more controller functions may be associated with a particular register, and the function or functions are programmed in accordance with the parameter. In such a function interface, the command data 506 may include one or more address bits 508 which specify a particular addressable register in a set of addressable registers, and one or more data bits 510 which specify the parameter to be written to the specified register. The function interface, in turn, communicates a command, such as the trim commands 132, 142, to the corresponding controller functions, such as the trim functions 130, 140, for implementation by the controller of the power adapter.

The protocol 500 also includes cyclic redundancy check (CRC) bits 512. The CRC bits 512 follow the command data 506, and are the last bits of the message. The CRC bits 512 provide a check code or confirmation code that is used to verify that a valid bit message has been received by the power adapter.

Considering now an addressable register set of a power adapter controller, and with reference to FIG. 6, an example addressable register set 600 includes a number of registers, three of which are illustrated. The number and function of registers can vary from controller to controller. In an example, the addressable register set 600 corresponds to the function interface 154 (FIG. 1). The contents of the address bits 508 of a received command 500 specify a particular register. For example, the example register set 600 includes a voltage trim register 602 at hex address 07, a gain compensation trim register 604 at hex address 08, and a relative adjustment register 606 at hex address 09. The data bits 510 of the received command 500 are written to the particular register which is specified by the address bits 508, and correspond to a parameter setting for the function that is associated with that register.

The data bits 510 may be interpreted differently for each register. For example, assume that in a given controller a command 500 has sixteen data bits 510. For the voltage trim register 602, the data bits 510 represent a signed binary integer number which corresponds to a −10% to +10% offset in the nominal regulated output value. In other words, one data bit represents the direction of the offset (up or down), and the remaining fifteen data bits represent the magnitude of the offset. A data bit value of 0 specifies no offset; a data bit value of 0x7FFF hex specifies +10% offset (code/0x7FF*10%); and a data bit value of 0x8000 hex specifies −10% offset using two's complement binary representation of 0x10000*−1 (−code/0x10000*10%). Thus each step in data bit value corresponds to an approximately 0.0305% change, which is the programming resolution of the voltage trim register. For the example power adapter 100 of FIG. 1, the data bit value written to the voltage trim register 602 corresponds to an absolute voltage trim setting 132 of the voltage trim function 130 of the controller 120.

For the gain compensation trim register 604, the data bits 510 represent a signed binary number which corresponds to a −5% to +5% trim in gain compensation. In other words, one data bit represents the type of gain compensation (positive or negative), and the remaining fifteen data bits represent the magnitude of the gain compensation. A data bit value of 0 specifies that no gain compensation is to be applied. A positive data bit value from 0x0001 to 0x7FFF hex specifies positive gain compensation, with a data bit value of 0x7FFF hex corresponding to a 5% increase in the regulated output voltage at full rated current as compared to the regulated output voltage at no load. A negative data bit value from 0x8000 hex to 0xFFFF hex specifies negative gain compensation, with a data bit value of 0x8000 hex corresponding to a 5% decrease in the regulated output voltage at full rated current as compared to the regulated output voltage at no load. Thus each step in positive or negative data bit value corresponds to an approximately 0.0153% change in gain compensation, which is the programming resolution of the gain compensation trim register. For the example power adapter 100 of FIG. 1, the data bit value written to the gain compensation trim register 604 corresponds to an absolute gain compensation trim setting 142 of the gain compensation trim function 140 of the controller 120.

For the relative adjustment register 606, the sixteen data bits 510 are divided into two eight-bit segments, each of which represents a signed binary number in the range of −128 to +127. One of the eight-bit numbers represents a relative adjustment to the present setting of the voltage trim function, while the other eight-bit number represents a relative adjustment to the present setting of the gain compensation trim function. For example, assume that the relative adjustment register 606 is written with a relative voltage trim value of −10 hex, which in turn generates a relative voltage trim setting 132 to the voltage trim function 130. In addition, assume that the voltage trim function 130 was last programmed with a data bit value of 0x3FFF hex, and thus has a present setting of 0x3FFF hex which produces a +5% offset in regulated output voltage. The voltage trim function 130 applies the relative trim value of −1 hex to the most significant 8 bits of the present setting of 0x3FFF hex, resulting in a new setting of 0x3EFF hex. Based on approximately a 0.000305% change per bit, the regulated output voltage will be decreased by 0.0783% to yield a new offset for the regulated output voltage of +4.9217%.

While an addressable register set has been described in which all registers have sixteen data bits, it is recognized that other controllers may have registers sets with more or fewer data bits, or even a different number of data bits for each register.

Figure 7:
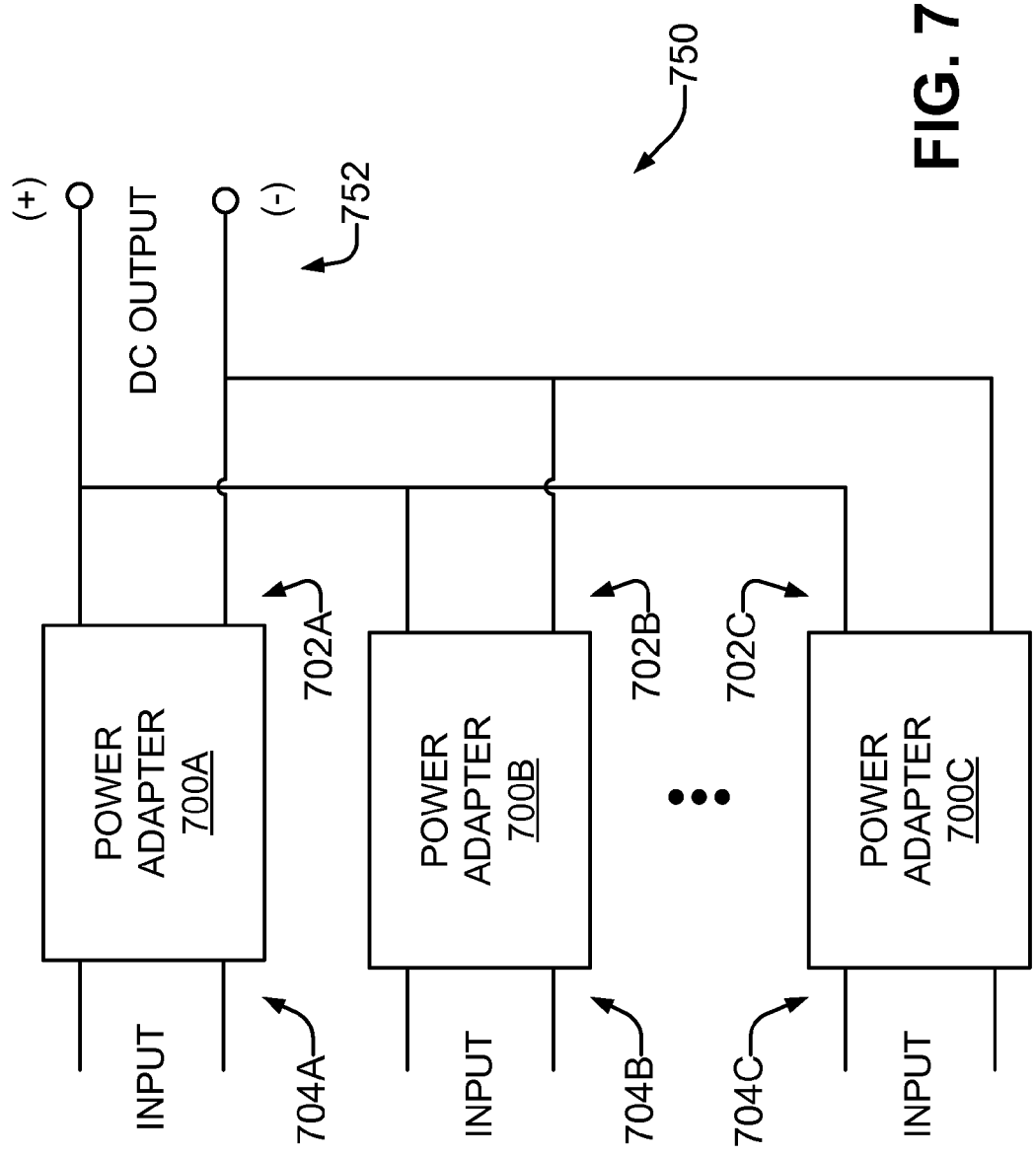
FIG. 7 is a schematic representation of a power supply in accordance with an embodiment of the present disclosure constructed from multiple power adapters such as the power adapters of FIG. 1 or FIG. 2.

Considering now a power supply constructed from multiple power adapters, and with reference to FIG. 7, an example power supply 750 includes three individual power adapters 700A, 700B, 700C (collectively 700). Each power adapter 700 may be, for example, power adapter 100 (FIG. 1) or power adapter 200 (FIG. 2). Each power adapter 700 has a DC power output 702 (e.g. 702A, 702B, 702C). In some examples AC input power is provided to each power adapter 700, while in other examples DC input power is provided to each power adapter 700. In still other examples, AC input power may be provided to some power adapters 700 while DC input power may be provided to other power adapters 700. While three power adapters 700 are illustrated, it is understood that the power supply 750 includes two or more power adapters 700. Typically, each power adapter 700 produces output power at the same nominal regulated DC output voltage.

Each DC output 702 has a positive (+) and a negative (−) output terminal. The positive (+) terminal of all the outputs 702A, 702B, and 702C are connected together, forming the positive (+) terminal of the DC output 752 of the power supply 750. Similarly, the (−) terminal of all the outputs 702A, 702B, and 702C are connected together, forming the negative (−) terminal of the DC output 752 of the power supply 750.

Each power adapter 700 has a voltage trim function and a negative gain compensation trim function. The gain compensation trim function is operable in a negative gain compensation mode, and in some examples may also be operable in a positive gain compensation mode. These trim functions are individually programmable by applying a pattern of current pulses at the power output of the adapter 700. The trim functions, gain compensation modes, and current pulse programming may be provided as has been described heretofore with reference to the power adapter 100 (FIG. 1) and/or the power adapter 200 (FIG. 2).

As will be discussed subsequently in greater detail, the outputs 702 of the power adapters 700 are wired together to allow the power supply 750 to provide more current to a load device than any power adapter 700 could provide individually, through current sharing. However, in many models of power adapter 700 of the same nominal regulated output voltage, particularly low-cost adapters 700, the tolerance for this nominal voltage is specified widely enough such that the actual regulated DC output voltage may vary significantly from adapter to adapter. In addition, the output voltage droop characteristic may also differ between and among a set of power adapters 700. As a result, the power adapters 700 may have significantly different nominal voltage/current curves. Significant differences in the curves among the different power adapters 700 of the power supply 750 can inhibit or prevent effective current sharing among the various adapters 700. As a result, the power supply 750 will fail to provide the desired amount of current, and may fail to operate at all.

To overcome the effect of significant differences in the voltage/current curves, some alternative designs for sharing current among multiple power adapters add resistors or diodes in the connections between outputs to couple the adapters together. However, diode coupling is typically ineffective, while resistor coupling lowers the total output power and reduces efficiency. Other alternative designs share a system clock among the power adapters, which disadvantageously makes additional connections between the various power adapters. Still other alternative designs disadvantageously include the additional element of a common controller. All of these alternative solutions also add cost.

Instead, in the power supply 750 of the present disclosure, the voltage trim function and the negative gain compensation trim function are individually programmed to minimize or eliminate differences in the voltage/current curves of the various power adapters 700 in the power supply 750. The programming is performed by applying the appropriate patterns of current pulses at the power output of each adapter 700.

Figure 8:
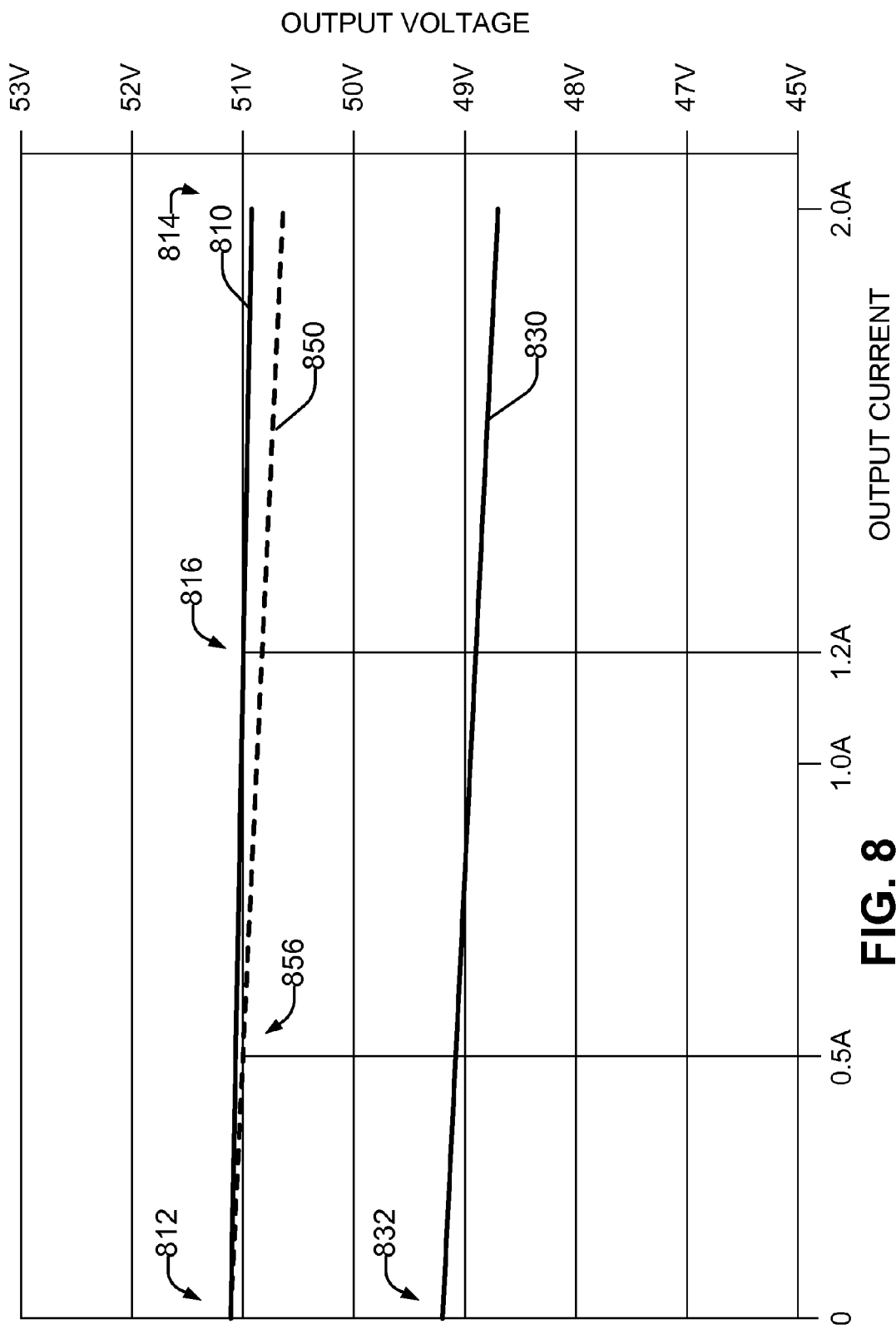
FIG. 8 illustrates example voltage/current curves of power adapters in accordance with an embodiment of the present disclosure, such as the power adapters of FIG. 1 or FIG. 2, having low voltage output droop.
Figure 9:
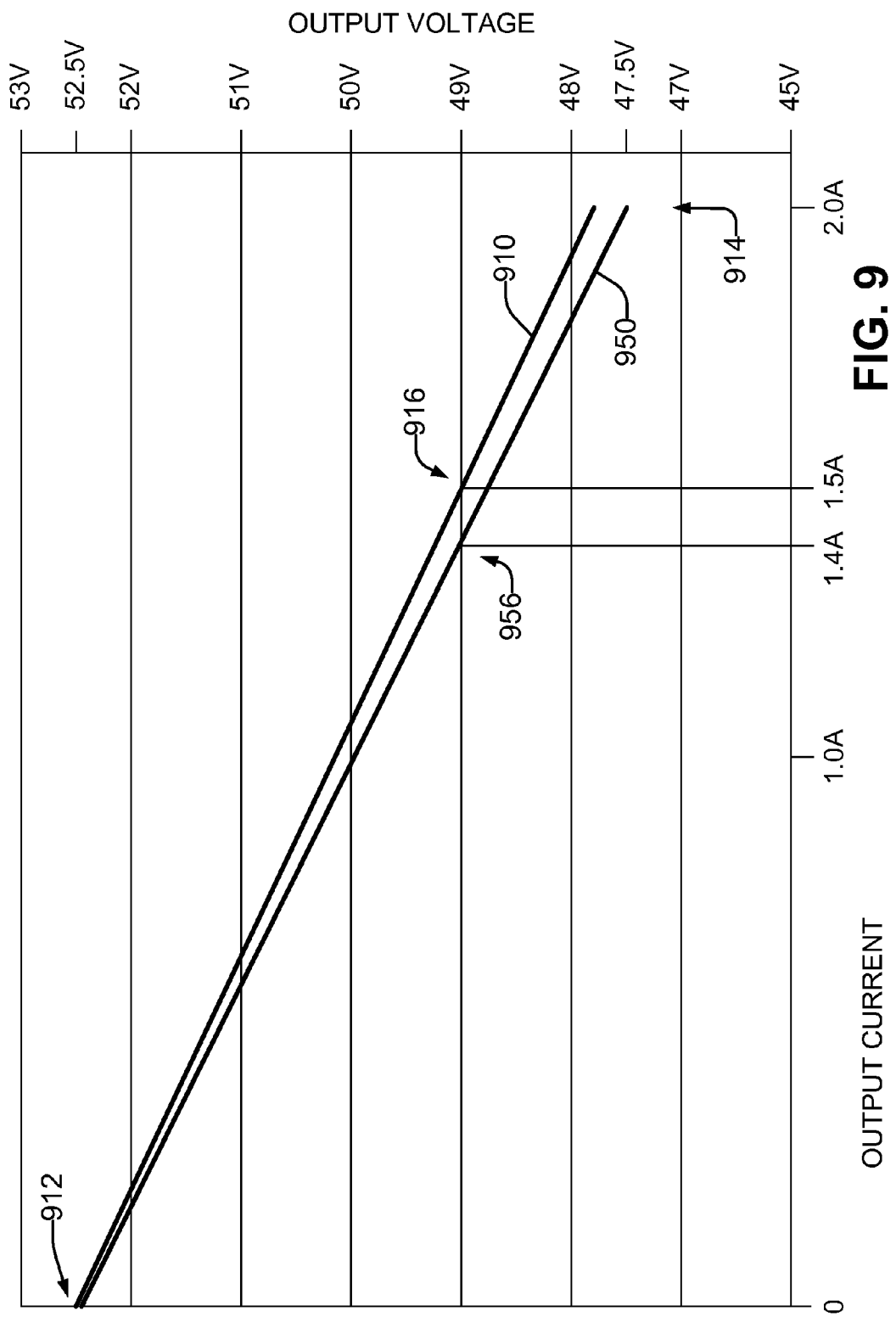
FIG. 9 illustrates example voltage/current curves of power adapters in accordance with an embodiment of the present disclosure, such as the power adapters of FIG. 1 or FIG. 2, programmed to provide negative gain compensation that increases the voltage output droop.

The programming of the voltage trim function and the negative gain compensation function of different power adapters 700 to minimize or eliminate differences in their voltage/current curves and allow effective current sharing to occur can be appreciated with reference to the example voltage/current curves of FIGS. 8-9.

For purposes of these examples, assume that the power supply 750 has two power adapters 700A, 700B total, and that both of these adapters have a nominal regulated output voltage of 50V. As illustrated in FIG. 8, the first power adapter 700A has a nominal curve 810 prior to any programming of its voltage trim or negative gain compensation trim functions, while the second power adapter 700B has a nominal curve 830 prior to any programming of its voltage trim or the negative gain compensation trim functions. The first power adapter 700A outputs about 51.1V at its zero current (no load) point 812, while the second power adapter 700B outputs about 49.2V at its zero current (no load) point 832. The slight downward slope of the curve 810 with increasing current illustrates the low output voltage droop of the adapter 700A with increasing load. At the 2.0 A current draw point 814, the regulated output voltage droops to about 50.9V. Since the regulated output voltage does not droop into the regulation range of adapter 700B, there is no current sharing: adapter 700A supplies all the current, while adapter 700B supplies no current.

Now, consider the effect of both power adapters 700A, 700B having the same regulated output voltage at the zero current point 812, but different output voltage droop characteristics. For example, the power adapter 700B may be calibrated via the voltage trim function under a substantially no load condition to generate the same 51.1V regulated output at the zero current point 812. However, while adapter 700B also has a low output voltage droop, its voltage/current curve 850 is slightly steeper than the corresponding curve 810 of adapter 700A. Assume that the load is such that both adapters 700A, 700B are regulating and supplying current. However, because of the differences between the slopes of the curves 810, 850, and the relatively low voltage droop for a relative large change in current of both slopes, current is shared very unequally between the adapters 700A, 700B.

For example, consider the condition where the regulated output voltage of the power supply 750 is 51.0V. Under this condition, a total of about 1.7 A are being drawn from the power supply 750 by a connected load device. However, the amount of current supplied by power adapter 700A is quite different from the amount of current supplied by power adapter 700B. At point 816 where the curve 810 for power adapter 700A corresponds to 51.0V, power adapter 700A is supplying 1.2 A of the 1.7 A total, or about 68% of the total current from the power supply 750. However, at point 856 where the curve 850 for power adapter 700B corresponds to 51.0V, power adapter 700B is supplying 0.5 A of the 1.7 A total, or about 32% of the total current from the power supply 750. As has been discussed heretofore, unequal current from different adapters may generate excessive internal temperatures that can shut adapter 700A down, degrade its operation, or shorten its lifetime.

By programming the negative gain compensation trim function in addition to the voltage trim function, the adapters 700A, 700B can be programmed to minimize differences in the voltage/current curves of the adapters and achieve effective current sharing among the adapters. Programming the gain compensation trim function changes the slope of the voltage/current curve of a power adapter. The negative gain compensation mode reduces the regulated output voltage of a particular power adapter in proportion to an increase in an amount of current supplied by that adapter. In other words, the output voltage regulation setpoint of the power adapter is reduced in proportion to the increase in the amount of current supplied by that adapter. As illustrated in FIG. 9, the gain compensation trim function of both adapters 700A, 700B is programmed to provide negative gain compensation. The negative gain compensation increases the output voltage droop of the adapters that occurs with increasing load current; in other words, the steepness of the slopes of the voltage/current curves is increased. Curve 910 represents the modified voltage/current curve of power adapter 700A after negative gain compensation has been applied, while curve 950 represents the modified voltage/current curve of power adapter 700B after negative gain compensation has been applied. In comparing curve 910 to curve 810, and curve 950 to curve 850, it can be appreciated that the regulated output voltage is reduced (i.e. droops) more for a given increase in load current in curves 910, 950 as a result of the negative gain compensation than in curves 810, 850. The curves 910, 950 are substantially linear.

In addition, both the voltage trim function and the negative gain compensation function are programmed to match the voltage/current curves of the two adapters as closely as possible. Ideally, it would be desirable for the two curves 910, 950 to be exactly overlaid to eliminate any difference in the response of the two adapters to current draw. However, the resolution or precision limits of the trim functions and/or the trim commands may not allow for the curves to be exactly overlaid, in which case the functions for each adapter can be programmed to minimize the differences between the voltage/current curves of the two adapters and thus minimize the difference in the response of the two adapters to current draw. For example, as illustrated in FIG. 9, there is a slight difference in voltage between the curves 910, 950 at both the zero load current point 912 and the full rated load current point 914 of about 2.0 A.

Since the curves 910, 950 are substantially linear, the differences in the curves may be minimized by minimizing the output voltage regulation setpoint difference between adapters for a higher voltage setpoint corresponding to substantially zero load current, and minimizing the output voltage regulation setpoint difference between adapters for a lower voltage setpoint corresponding to substantially full rated load current.

The effect of overlaying, as closely as possible, two voltage/current curves 910, 950 having increased output voltage droop can be appreciated by observing the current drawn at a given regulated output voltage. For example, at point 916 where the curve 910 for power adapter 700A corresponds to 49.0V, power adapter 700A is supplying 1.5 A. At point 956 where the curve 950 for power adapter 700B also corresponds to 49.0V, power adapter 700A is supplying 1.4 A. Thus power adapter 700A supplies 51.7% of the total current of 2.9 A, while power adapter 700A supplies 48.3% of the total current. As a result, effective current sharing is implemented in the power supply 750 with neither power adapter supplying an excessive amount of power, advantageously allowing both power adapters 700A, 700B to operate in a normal internal temperature range.

Figure 10:
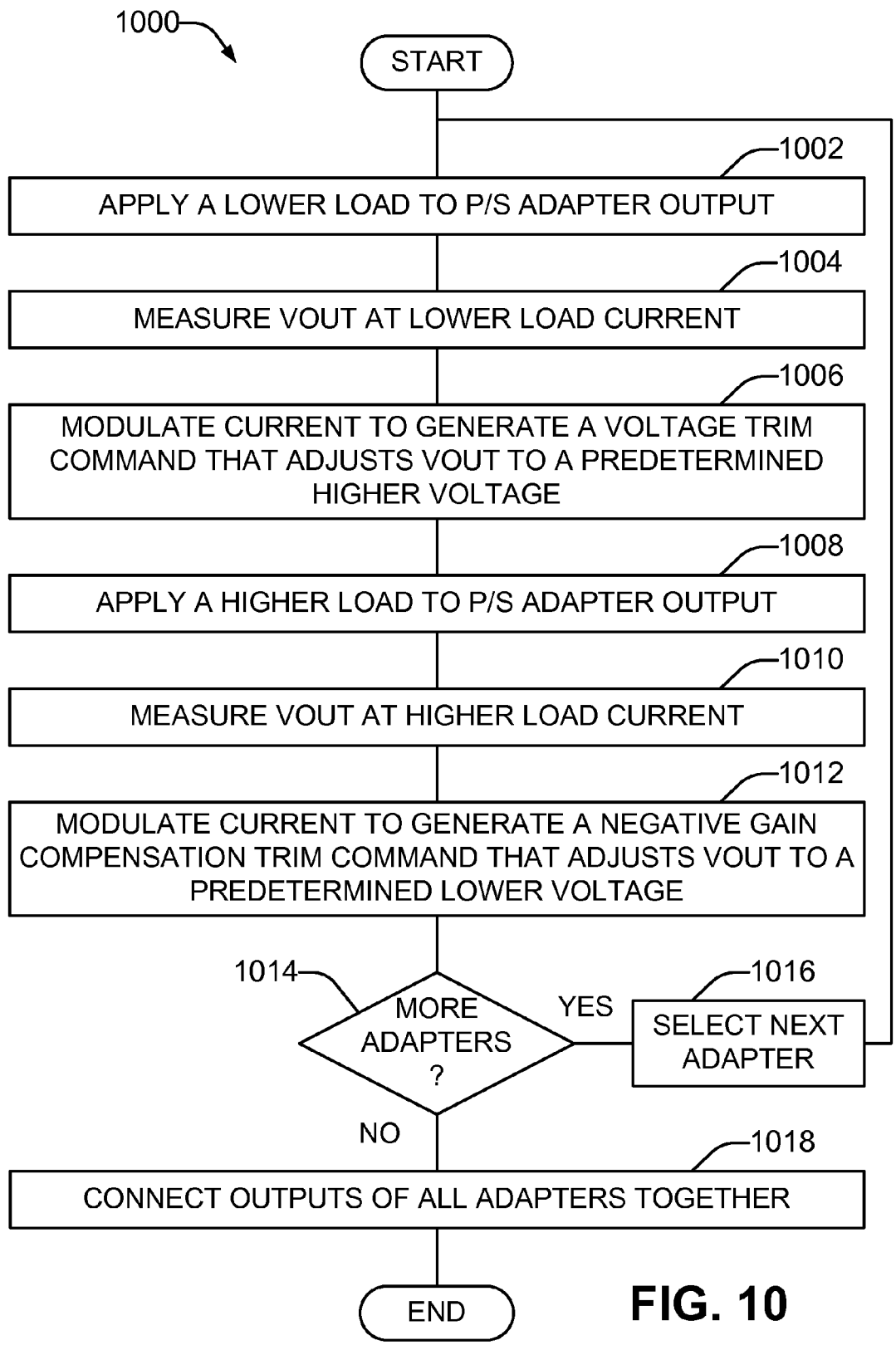
FIG. 10 is a flowchart in accordance with an embodiment of the present disclosure of a method of configuring a power supply having plural power adapters.

Considering now a method 1000 of configuring a power supply having plural power adapters, and with reference to FIG. 10, each power adapter has a power output, and has voltage trim and negative gain compensation trim functions programmable via a pattern of current pulses applied to the power output. In some examples, the power adapter may be the power adapter 100 (FIG. 1) or the power adapter 200 (FIG. 2).

Each power adapter is calibrated individually. At 1002, a relatively lower load is applied to the power output of the power adapter. The load is provided by a load device connected to the power output of the adapter. In some examples, the relatively lower load is substantially zero current (i.e. no load). At 1004, the nominal regulated output voltage at the power output of the adapter at the relatively lower load current is measured. The regulated output voltage may be measured by the load device itself, or by another device connected to the power output such as a voltmeter. At 1006, the current is modulated by the load device to generate a voltage trim command to the power adapter that adjusts the regulated voltage to a predetermined higher voltage. In order to allow the method 1000 to achieve optimal current sharing among all the adapters, the predetermined higher voltage in some examples may be substantially the highest operating voltage that can be tolerated by a load device to which the configured power supply will later be connected. It is noted that the load device used to calibrate the power adapters may be a calibration adapter that is different from the target load device which the multiple-adapter power supply is intended to power after configuration.

At 1008, a relatively higher load is applied to the power output of the power adapter. At 1010, the nominal regulated output voltage at the power output of the adapter at the relatively higher load current is measured. At 1012, the current is modulated by the load device to generate a negative gain compensation trim command to the power adapter that adjusts the regulated output voltage to a predetermined lower voltage. In order to allow the method 1000 to achieve optimal current sharing among all the adapters, the predetermined lower voltage in some examples may be substantially the lowest operating voltage that can be tolerated by the target load device to which the configured power supply will later be connected. By choosing predetermined higher and lower voltages that correspond to the voltage tolerance limits of the eventual load device, the steepness of the slope of the voltage/current curve can be maximized, which in turn minimizes the difference in current supplied among different power adapters for a given operating voltage of the power supply. Referring back to FIG. 9 for example, assume that the target load device operates at 50VDC with a tolerance of +/−5%. The predetermined higher voltage used to calibrate each of the power adapters may be substantially 50V+5%, or 52.5V, while the predetermined lower voltage used to calibrate each of the power adapters may be substantially 50V−5%, or 47.5V.

At 1014, it is determined whether there are more power adapters to be calibrated for the power supply. If so ("Yes" branch of 1014), then at 1016 the load device is disconnected from the power adapter that has just been calibrated and the next adapter is selected, after which the method loops to 1002 to be repeated for the next adapter.

If there are no more power adapters to be calibrated for the power supply ("No" branch of 1014), then at 1018 the outputs of all the adapters are connected together. At this point the power supply is configured, and the method 1000 ends.

Figure 11:
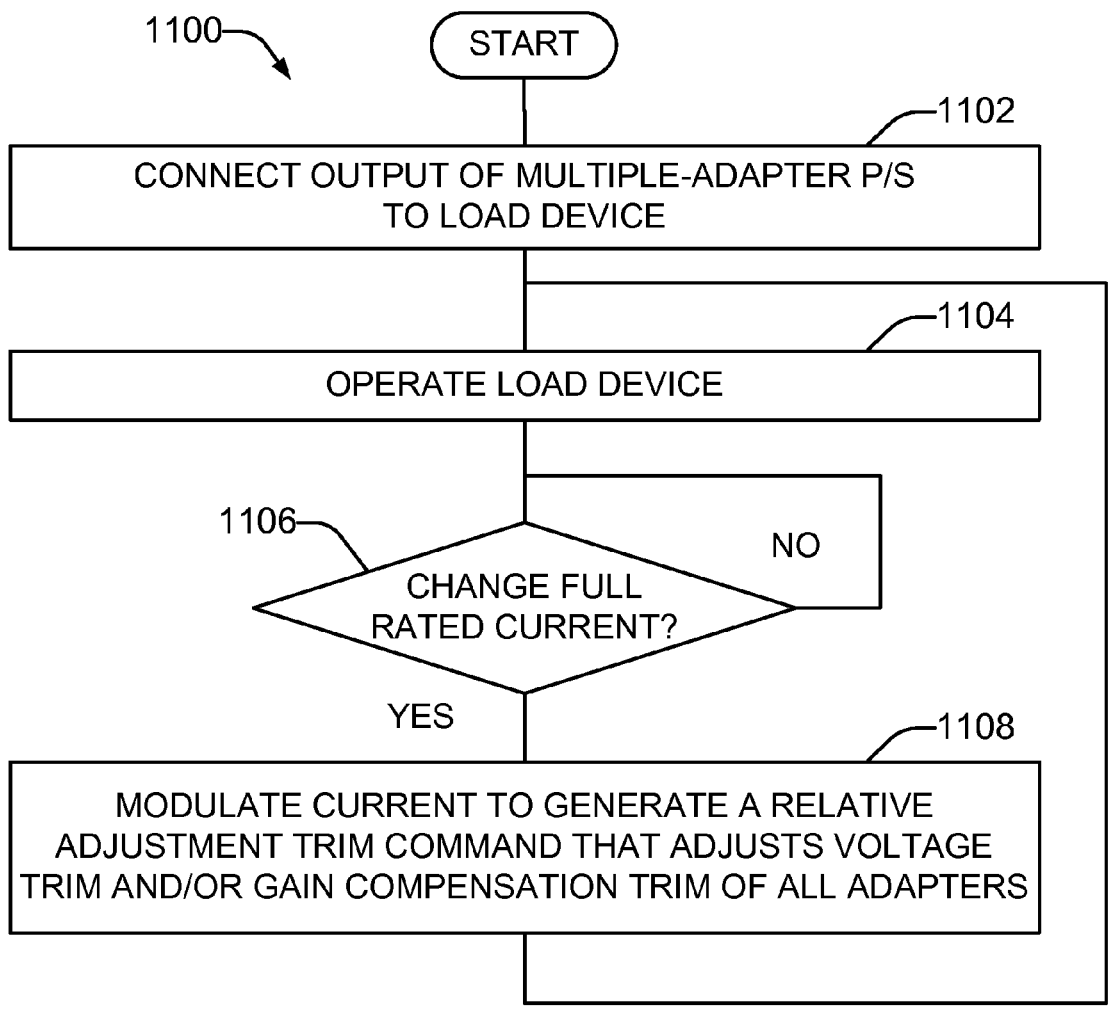
FIG. 11 is a flowchart in accordance with an embodiment of the present disclosure of another method of configuring a power supply having plural power adapters.

Considering now another method 1100 of configuring a power supply having plural power adapters, and with reference to FIG. 11, the method 1100 may be performed after the method 1000. The method 1100 may alternatively be considered as a continuation of the method 1000.

At 1102, the output of the multiple-adapter power supply is connected to the target load device. At 1104, the load device is operated, with the power supply providing power to the load device. At 1106, it is determined whether to reconfigure the power supply for a different full rated load current. For example, the load device may have been reconfigured by adding an additional hardware module to the load device which uses additional power that was not taken into consideration during the method 1000. If the full rated load current is to be changed ("Yes" branch of 1106), then at 1108 the current is modulated by the load device to generate a relative adjustment trim command to the power adapter that adjusts at least one of the voltage trim function or the negative gain compensation function by a specified amount. Because the power outputs of all the power adapters of the power supply are connected together, the relative adjustment trim command is issued to, and responded to by, all the power adapters in the power supply. Because the power adapters have been previously configured to have substantially the same voltage/current curves, the relative adjustment in voltage trim and/or negative gain compensation trim adjusts the voltage/current curves of all the adapters in substantially the same way.

From the foregoing it will be appreciated that the power adapter, power supply, and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit embodiments. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A power adapter, comprising:
    an output to supply DC power at a regulated voltage to a load;
    a controller having a programmable gain compensation trim function; and a command processor in the controller to program the gain compensation trim function to either increase the regulated voltage with increasing load current or decrease the regulated voltage with increasing load current, wherein the command processor programs the gain compensation trim function based at least in part on a pattern of current pulses detected at the output, wherein the pattern of detected current pulses correspond to a command that specifies a parameter associated with the gain compensation trim function.

2. The adapter of claim 1, comprising:
a mechanism to detect the current pulses at the output, wherein the current pulses are generated by the load at the output and provide the current pulses to the command processor; and
a state machine in the command processor that identifies the pattern of the detected current pulses as the command, wherein the command is from the load and the parameter specifies a setting to which to program the gain compensation trim function.

3. The adapter of claim 2, comprising:
an interface in the command processor to receive the command from the state machine and apply the command to the gain compensation trim function.

4. The adapter of claim 3, wherein the interface comprises:
an addressable register, in a set of addressable registers, that corresponds to the gain compensation trim command.

5. The adapter of claim 2, wherein the parameter specifies an amount by which the regulated voltage at zero load current is increased at full rated load current and that, for a negative value, specifies an amount by which the regulated voltage at zero load current is decreased at full rated load current.

6. The adapter of claim 5, wherein the regulated voltage changes substantially linearly from zero load current to full rated load current.

7. The adapter of claim 1, the controller further comprising:
a voltage trim function programmable by the command processor to adjust the regulated voltage by a specified amount at all load currents.

8. The adapter of claim 7, further comprising:
a state machine that identifies the pattern of the detected current pulses as the command,
wherein the state machine recognizes the pattern of the detected current pulses as a voltage trim command issued by the load to program the voltage trim function to a setting specified by the parameter of the command.

9. The adapter of claim 8, wherein the state machine recognizes the pattern of the detected current pulses as a relative trim adjustment command issued by the load to offset at least one of the gain compensation trim function or the voltage trim function from its present setting by an amount specified by the parameter of the command.

10. The adapter of claim 1, comprising:
an input to supply AC power to the adapter, wherein the adapter is an AC-to-DC power adapter.

11. The adapter of claim 1, comprising:
an input to supply DC power to the adapter, wherein the adapter is a DC-to-DC power adapter.

12. A power supply, comprising:
at least two power adapters each having, a power output and a different nominal voltage/current curve, the power outputs of the adapters connected together; and
a voltage trim function and a negative gain compensation trim function in each of the adapters, the trim functions programmable by applying a pattern of current pulses at the power output;
wherein the trim functions of the adapters are individually programmed to minimize differences in the voltage/current curves of the adapters.

13. The power supply of claim 12, wherein the negative gain compensation trim function reduces an output voltage regulation setpoint of a particular adapter in proportion to an increase in an amount of current supplied by that adapter.

14. The power supply of claim 12, wherein the trim functions are programmed to minimize a difference between the adapters in a higher output voltage regulation setpoint at substantially zero current, and a difference between the adapters in a lower output voltage regulation setpoint at substantially full rated current.

15. The power supply of claim 14, wherein the higher output voltage regulation setpoint is substantially the highest voltage that a load connected to the power supply can tolerate, and wherein the lower output voltage regulation setpoint is substantially the lowest voltage that a load connected to the power supply can tolerate.

16. The power supply of claim 12, comprising:
a positive gain compensation trim function in the adapters that is programmable to increase an output voltage regulation setpoint of a corresponding adapter in proportion to an increase in an amount of current supplied by that adapter when disconnected from the other adapters.

17. A method of configuring a power supply having plural power adapters, each adapter having a power output and having voltage trim and negative gain compensation trim functions programmable based at least in part on a pattern of current pulses detected at the power output, comprising:
calibrating each adapter by,
measuring the output voltage at a lower load current,
modulating the lower load current to generate a voltage trim command that adjusts the output voltage to a first predetermined voltage,
measuring the output voltage at a higher load current, and
modulating the higher load current to generate a negative gain compensation trim command that adjusts the output voltage to a second predetermined voltage; and
after the calibrating, connecting the power outputs of all the adapters together to form the power supply,
wherein the first predetermined voltage is higher than the second predetermined voltage.

18. The method of claim 17, wherein the lower load current is substantially zero, the first predetermined voltage is substantially the highest voltage that a load connected to the power supply can tolerate, the higher load is substantially the full rated load current, and the second predetermined voltage is substantially the lowest voltage that the load can tolerate.

19. The method of claim 17, wherein the calibrating comprises:
applying a load to the power output of each adapter during the calibrating, wherein the load performs the modulating.

20. The method of claim 18, comprising:
reconfiguring the power supply for a different full rated load current while the power outputs of all the adapters are connected together by modulating the load current to generate a relative adjustment trim command that adjusts at least one of the voltage trim and the gain compensation trim of all the adapters by a specified amount.

* * * * *